United States Patent
Sato

(10) Patent No.: US 9,099,918 B2
(45) Date of Patent: Aug. 4, 2015

(54) POWER SUPPLY APPARATUS AND RECORDING APPARATUS

(75) Inventor: Takashi Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 13/357,515

(22) Filed: Jan. 24, 2012

(65) Prior Publication Data

US 2012/0194155 A1 Aug. 2, 2012

(30) Foreign Application Priority Data

Jan. 28, 2011 (JP) .................. 2011-016894

(51) Int. Cl.
| | |
|---|---|
| *G05F 1/00* | (2006.01) |
| *B41J 29/38* | (2006.01) |
| *H05K 1/16* | (2006.01) |
| *H05K 1/00* | (2006.01) |
| *H02M 3/156* | (2006.01) |
| *B41J 2/045* | (2006.01) |
| *B41J 29/393* | (2006.01) |
| *H02M 1/14* | (2006.01) |

(52) U.S. Cl.
CPC ............ *H02M 3/156* (2013.01); *B41J 2/04541* (2013.01); *B41J 2/04548* (2013.01); *B41J 2/04586* (2013.01); *B41J 29/393* (2013.01); *H02M 1/14* (2013.01)

(58) Field of Classification Search
CPC ......... G05F 1/46; H02M 3/155; H02M 3/156; B41J 29/38; B41J 2002/14491; B41J 2002/14201; B41J 2002/14322; B41J 2002/14362; B41J 2/01; B41J 2/14; B41J 2/14201; B41J 2/14209; B41J 2/14233; B41J 2/14072

USPC ......... 323/351, 222–226, 271–275, 282–285; 363/21.01, 15–19, 89, 123–127; 347/5, 347/14, 50; 399/37; 174/34, 36, 110, 113, 174/117, 260, 268

See application file for complete search history.

(56) References Cited

U.S. PATENT DOCUMENTS

| | | | | |
|---|---|---|---|---|
| 6,796,626 | B2 * | 9/2004 | Nishida | ............................. 347/5 |
| 6,948,791 | B2 * | 9/2005 | Togashi et al. | ................... 347/14 |
| 7,358,446 | B2 * | 4/2008 | Chheda et al. | ................. 174/260 |

(Continued)

FOREIGN PATENT DOCUMENTS

| | | |
|---|---|---|
| JP | H09-254388 A | 9/1997 |
| JP | 2000-190488 A | 7/2000 |

(Continued)

OTHER PUBLICATIONS

English translation (JP2000-190488).*

*Primary Examiner* — Timothy J Dole
*Assistant Examiner* — Carlos Rivera-Perez
(74) *Attorney, Agent, or Firm* — Canon USA Inc IP Division

(57) ABSTRACT

A power supply apparatus that suppresses radiation of noise while supplying a stable voltage, and a method of supplying power are provided. The power supply apparatus includes a power conversion unit configured to input a voltage to convert the voltage into an electric power; and a smoothing unit configured to include a coil, a capacitor, and a cable in which power supply wires connecting one end of the capacitor to the coil and ground wires connecting the other end of the capacitor to a ground of the power conversion unit are alternately arranged, and to smooth the voltage output from the power conversion unit.

19 Claims, 11 Drawing Sheets

(56) References Cited

U.S. PATENT DOCUMENTS

2003/0142164 A1    7/2003    Nishida
2005/0078463 A1    4/2005    Chheda

FOREIGN PATENT DOCUMENTS

JP    2003-225993 A    8/2003
JP    2004-098465 A    4/2004

* cited by examiner

FIG. 3

| FFC LENGTH [mm] | WIRE LOOP INDUCTANCE | | WIRE RESISTANCE | |
|---|---|---|---|---|
| | FIG. 2(a) | FIG. 2(b) | FIG. 2(a) | FIG. 2(b) |
| 1000 | 88nH | 283.5nH | 152mΩ | 152mΩ |
| 660 | 57nH | 188nH | 100mΩ | 100mΩ |
| 330 | 29nH | 94nH | 50mΩ | 50mΩ |

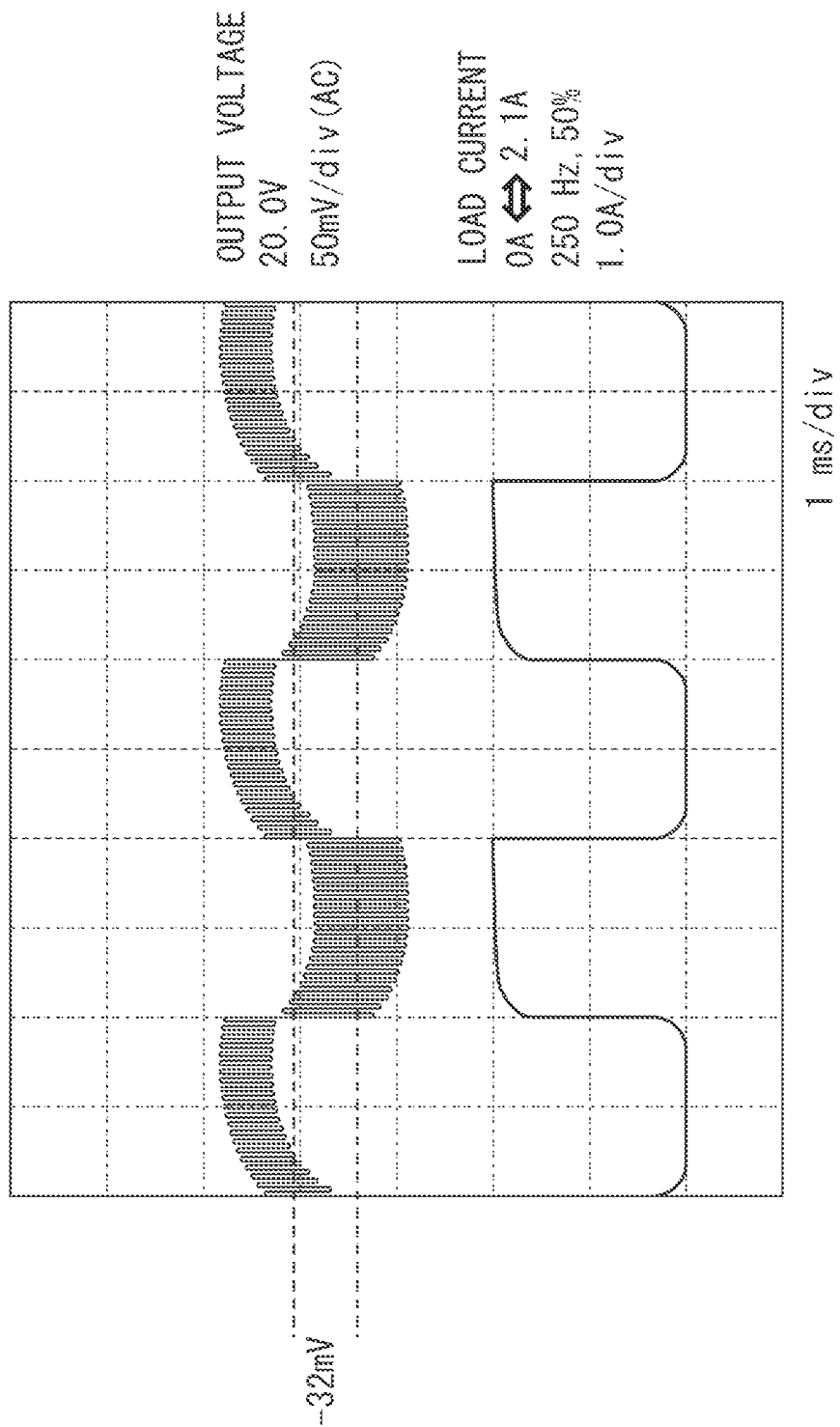

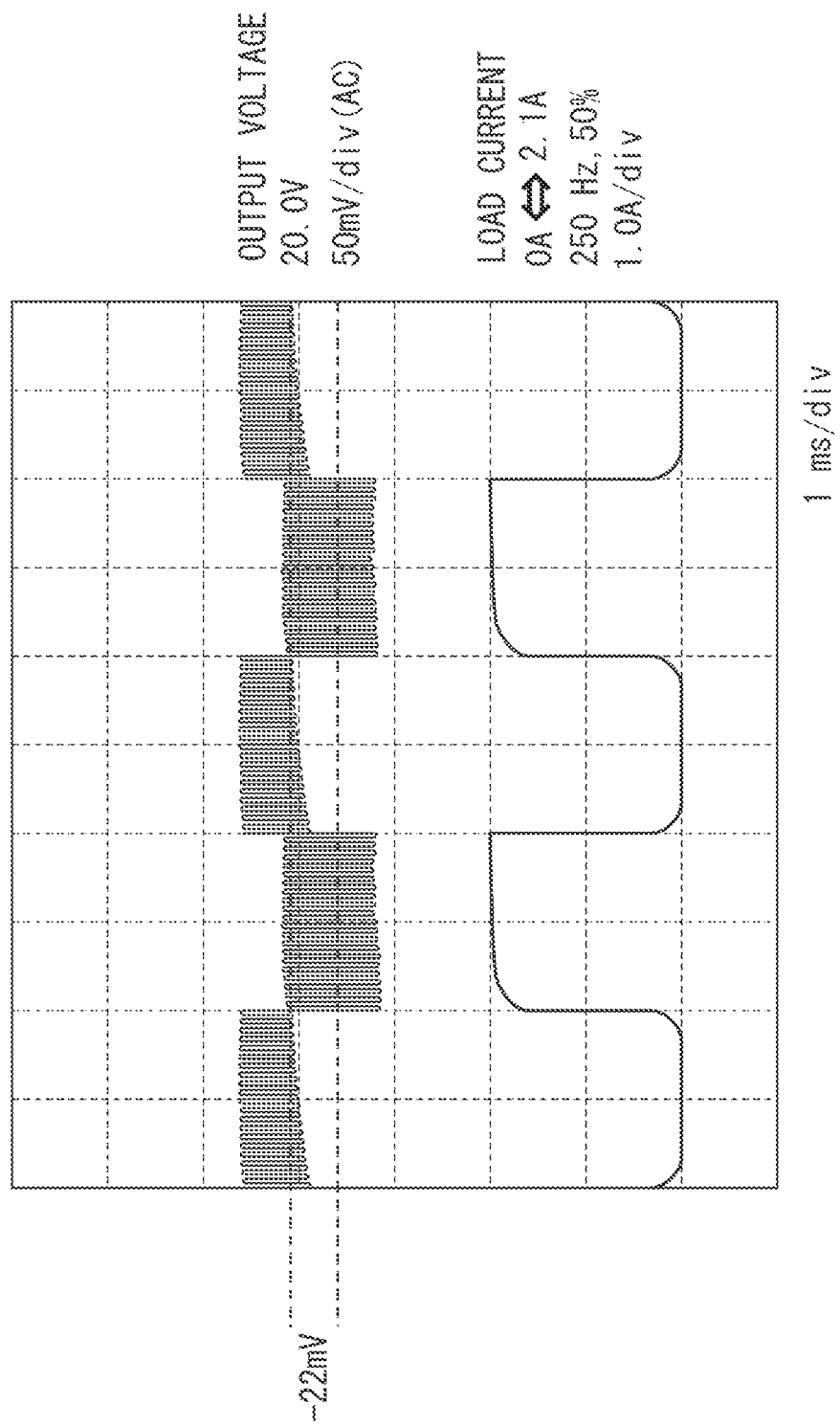

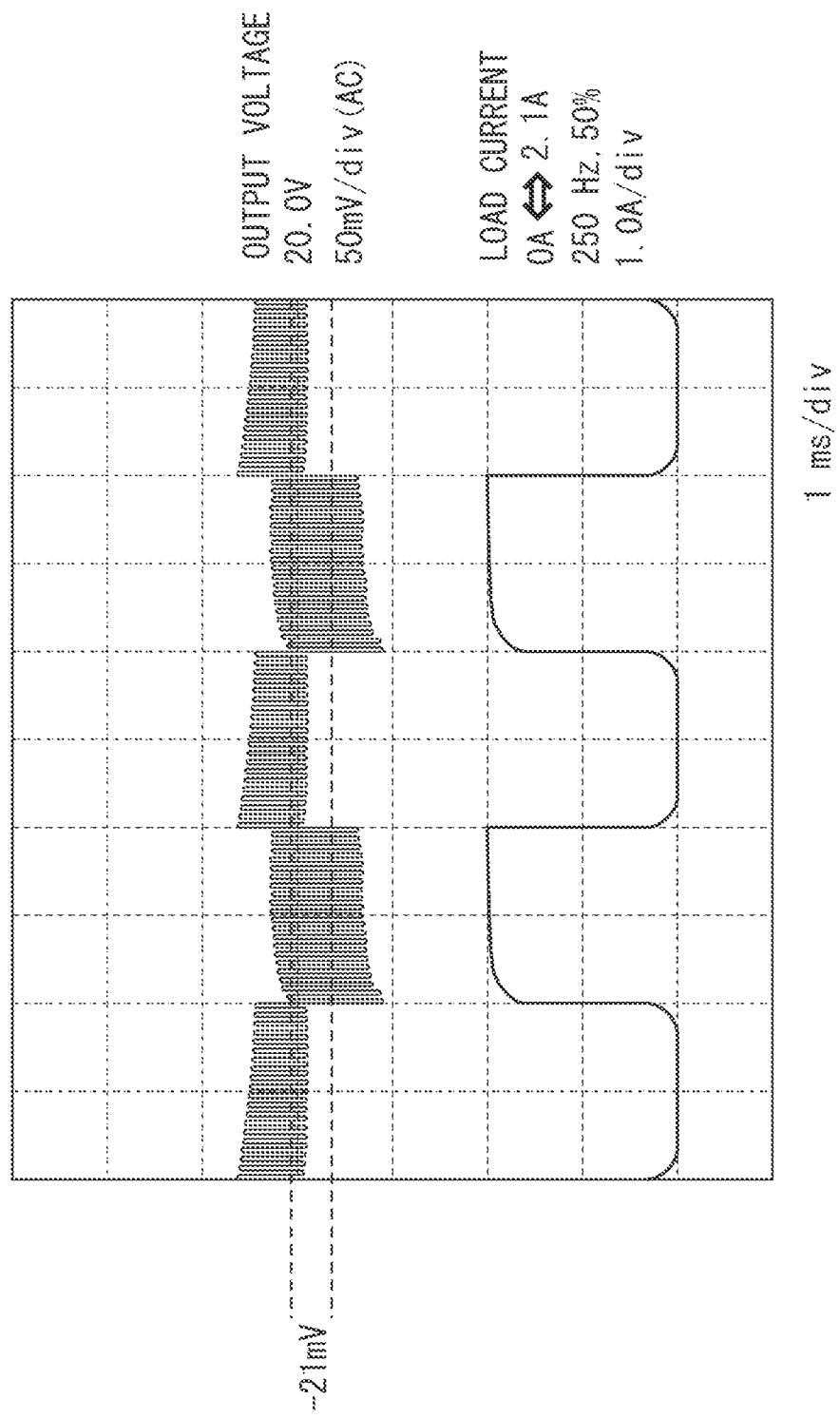

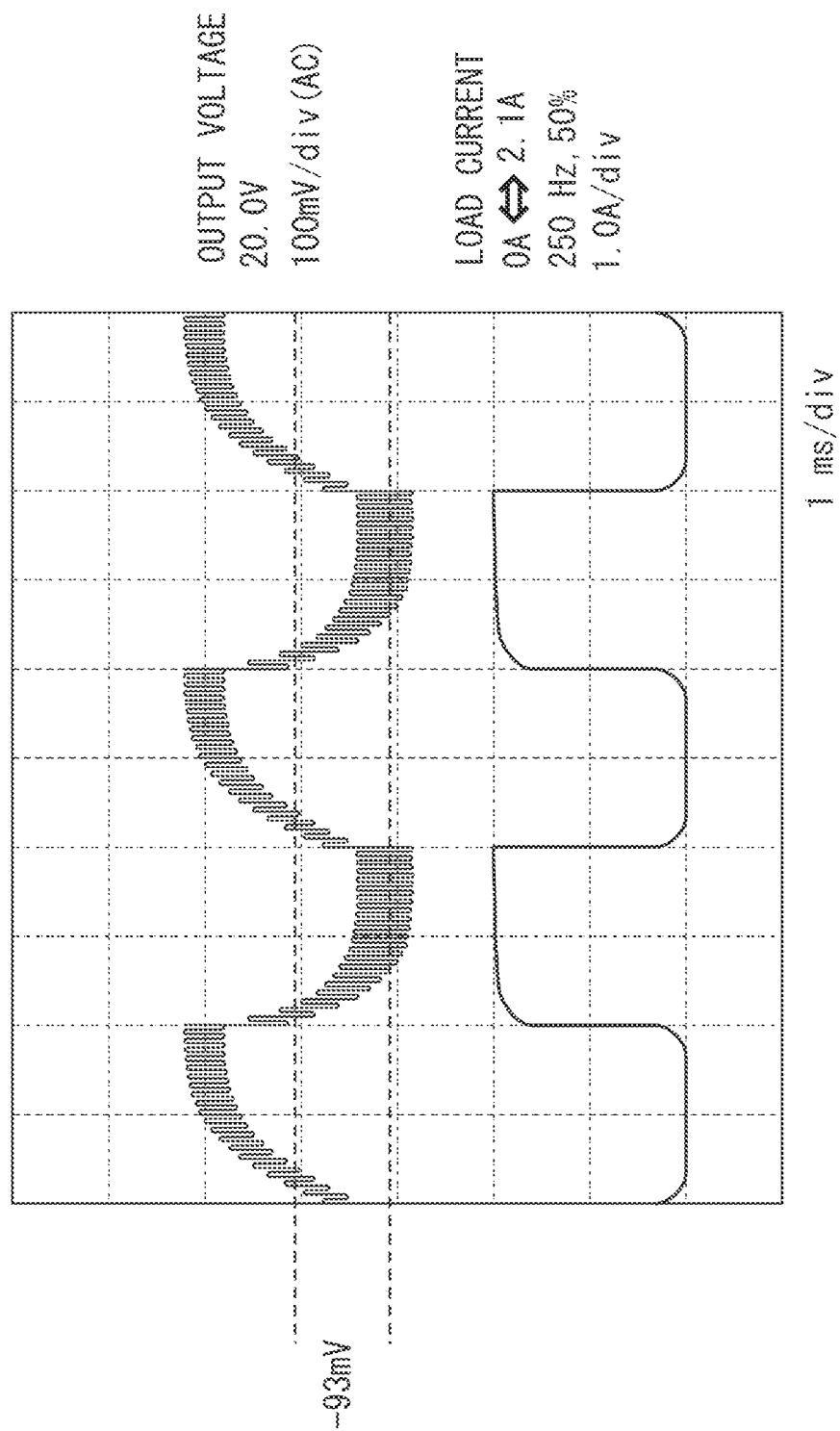

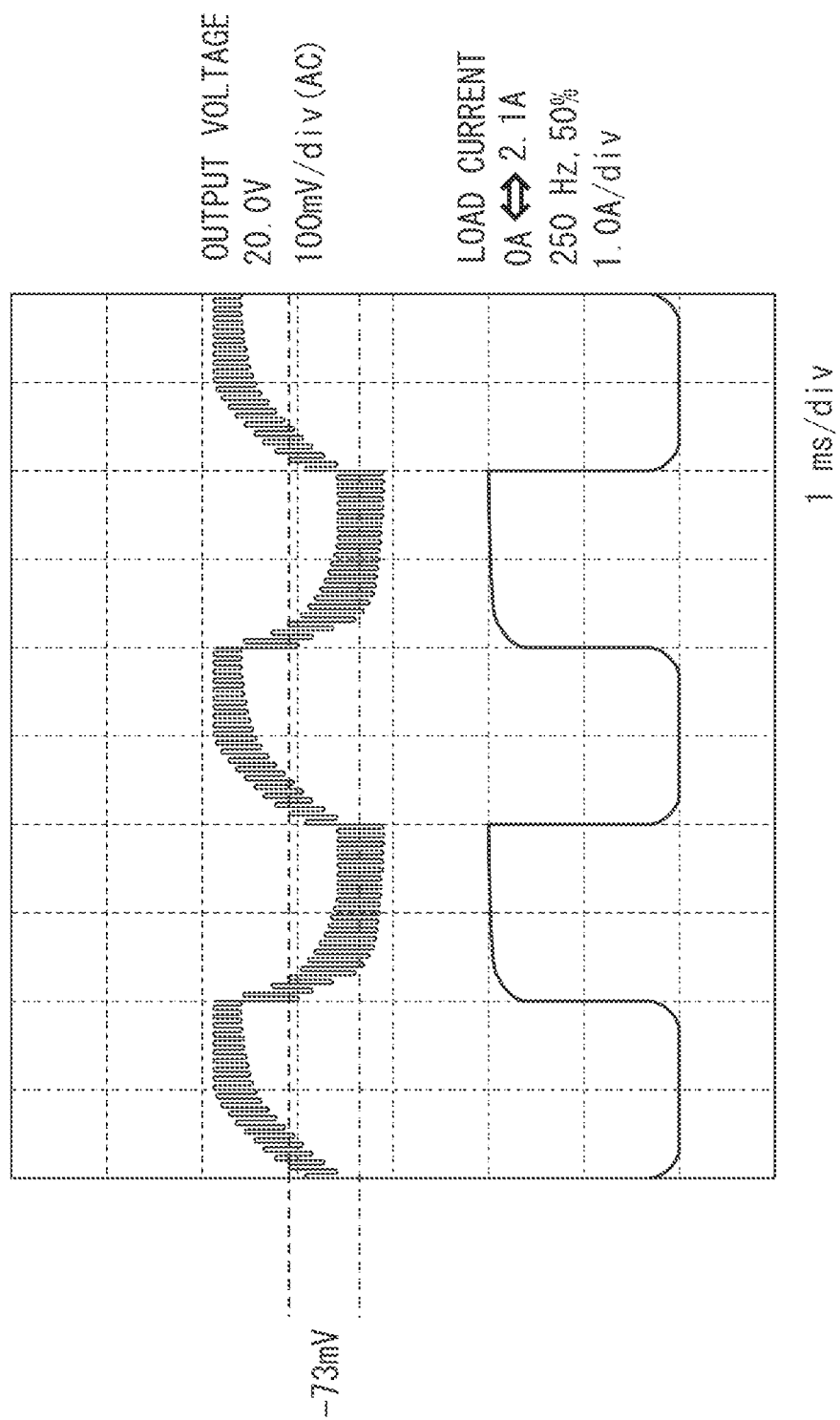

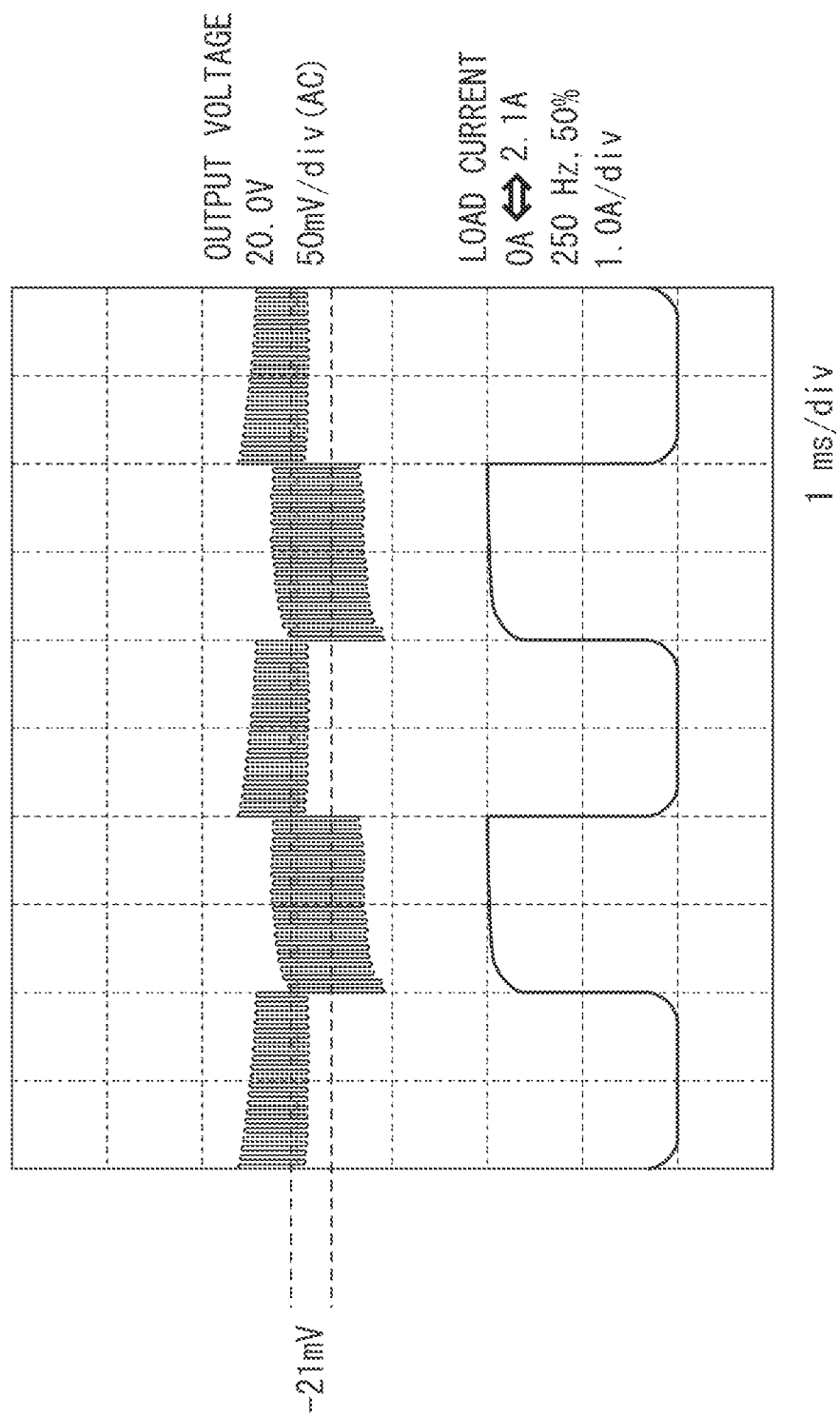

POWER SUPPLY APPARATUS AND RECORDING APPARATUS

BACKGROUND OF THE INVENTION

1. Field of the Invention

The present invention relates to a power supply apparatus and a recording apparatus.

2. Description of the Related Art

Japanese Patent Application Laid-Open No. 2003-225993 discusses a structure in which a voltage generated by a power source unit in a printer body is supplied to a Direct Current/Direct Current (DC/DC) converter in a carriage mounted with a recording head of the printer. Japanese Patent Application Laid-Open No. 2003-225993 also provides the carriage in a reduced size on which circuit boards are disposed as two divided pieces. As a result, the power supply circuit of the printer can suppress radiation of unwanted noise and supply a voltage in a stable manner.

The DC/DC converter of Japanese Patent Application Laid-Open No. 2003-225993 is provided with various electrical components including a switching device, a diode, a constant voltage control Input Circuit (IC), an inductor, and a resistor, to supply a voltage to the recording head acting as an electric load, with reduced fluctuation. In other words, the carriage in Japanese Patent Application Laid-Open No. 2003-225993 includes a power conversion unit (converter unit), a constant voltage control unit, and a smoothing circuit unit. This structure prevents further reduction in weight and size of the carriage.

SUMMARY OF THE INVENTION

The present invention is directed to providing a power supply apparatus, the apparatus including: a power conversion unit configured to input a voltage to convert the voltage into an electric power; and a smoothing unit configured to include a coil, a capacitor, and a cable in which power supply wires connecting one end of the capacitor to the coil and ground wires connecting the other end of the capacitor to a ground of the power conversion unit are alternately arranged, and to smooth the voltage output from the power conversion unit.

The present invention is further directed to providing a recording apparatus, the apparatus including: a first circuit board disposed in a body of the recording apparatus and provided with a power conversion unit configured to input a voltage to convert the voltage into an electric power and a coil connected to an output of the power conversion unit; a second circuit board disposed in a carriage having a recording head and provided with a capacitor connected to the recording head, the carriage; and a cable having power supply wires and ground wires that are alternately arranged, between the coil and the capacitor.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a table illustrating wiring impedances of FFC wiring.

FIGS. 4A, 4B, and 4C illustrate voltage fluctuations occurring at power supply through the wires of an FFC of an exemplary embodiment according to the present invention.

FIGS. 5A, 5B, and 5C illustrate voltage fluctuations occurring at power supply through the wires of an FFC in a case where an exemplary embodiment according to the present invention is not implemented.

DESCRIPTION OF THE EMBODIMENTS

Various exemplary embodiments, features, and aspects of the invention will be described in detail below with reference to the drawings.

Figure 1:
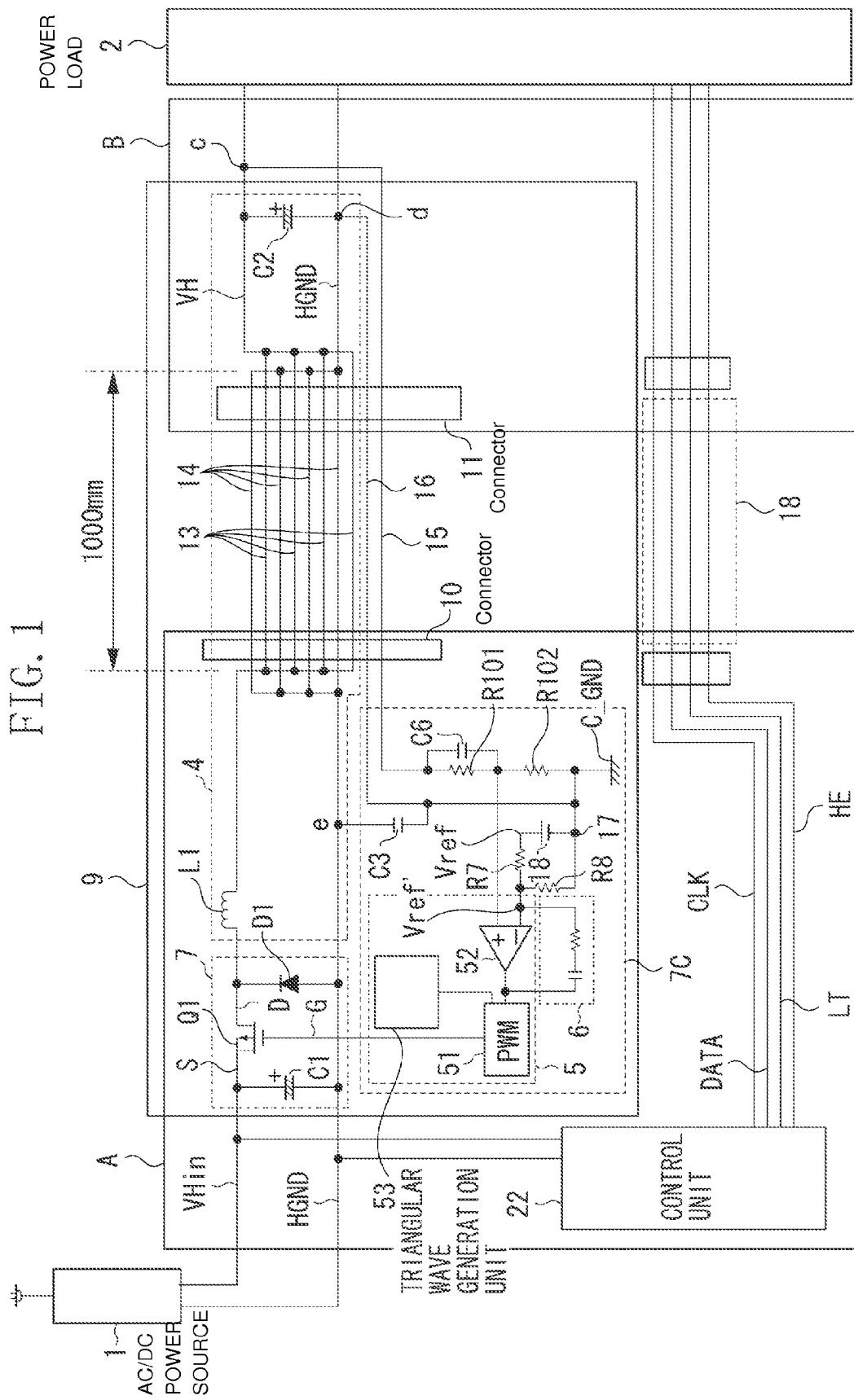
FIG. 1 illustrates a power supply apparatus according to a first exemplary embodiment of the present invention.

FIG. 1 illustrates a power supply apparatus according to a first exemplary embodiment of the present invention. In the present exemplary embodiment, a recording apparatus is used as an example of the subject apparatus, and a recording head 2 is used as an example of the power load. The recording apparatus includes first and second circuit boards (printed circuit boards). The first circuit board is a main board A mounted to the body of the recording apparatus, and the second circuit board is a carriage board B mounted to a carriage of the recording apparatus. The main board A is connected to the carriage board B by a flexible flat cable (hereinafter, referred to as an FFC) that has a plurality of flexible and conductive patterns arranged at regular intervals.

Components on both of the main board A and the carriage board B constitute a DC/DC converter 9 that generates a drive voltage VH to drive the recording head 2. The DC/DC converter 9 includes a converter unit (power conversion unit) 7 configured to convert a voltage to an electric power, a constant voltage control unit 7C, and a smoothing circuit unit 4. The smoothing circuit unit 4 includes a coil L1, a capacitor C2, power supply wires 13, and power-supply-wire ground wires 14. The coil L1 is disposed on the main board A, and the capacitor C2 is disposed on the carriage board B.

The main board A has the converter unit 7, the constant voltage control unit 7C, and the coil L1 of the smoothing circuit unit 4. The main board A further has a control unit 22 configured to control the recording apparatus, through control of the recording head 2 and control of a motor of the recording apparatus for example.

The capacitor C2 serves to smooth an output voltage of the DC/DC converter 9, and also serves to accommodate sharp change in a load current that is caused by ink discharge at the recording head 2. The capacitor C2 has low impedance, and is disposed close to the recording head 2.

The coil L1 is connected, at one end thereof, to the drain D of a switch element (Field Effect Transistor (FET)) Q1 that chops an input voltage VHin, and is connected to a connector 10 at the other end. The main board A has the connector 10, and the carriage board B has a connector 11. The connector 10 is connected to the connector 11 via the plurality of power supply wires 13 and the plurality of power-supply-wire ground wires 14.

Operations of the DC/DC converter 9 is briefly described. The DC/DC converter 9 operates in pulse width modulation (PWM) mode. The printer body has an alternating current (AC)/DC power source 1, which supplies a DC voltage VHin to be input to the source S of the switch element Q1 via a capacitor C1.

The converter unit (voltage conversion unit) 7 having the switch element Q1 and a diode D1 converts the DC (Direct Current) voltage VHin into an alternating voltage. The alternating voltage is converted into a DC (Direct Current) voltage through the smoothing circuit 4 having the coil L1, the FFC, and the capacitor C2 to generate an output voltage VH.

The output voltage VH is supplied as a head drive voltage VH to the recording head 2 that is connected to the carriage board. In FIG. 1, the ground for the converter unit (voltage conversion unit) 7 and the smoothing circuit unit 4 is represented as HGND.

The constant voltage control unit 7C performs feedback control on the switch element Q1 to regulate the output voltage VH. The feedback control is performed based on a reference voltage Vref'. The voltage Vref' is a result obtained by dividing a voltage Vref by resistors R7 and R8. The voltage Vref is generated by the voltage source 18. The voltage Vref' is input to an inverting terminal of an error amplifier 52 at a power source control IC 5.

The capacitor C2 and the point C are connected to an output unit of the smoothing circuit 4. The smoothing circuit 4 outputs voltage signal VH. The voltage obtained by dividing a voltage of point c by the resistor R101 and the resistor R102 is input to a non-inverting terminal of the error amplifier 52. The capacitor C2 is connected to an output unit of the smoothing circuit 4. A PWM comparator 51 outputs signals to turn on/off the switch element Q1, based on a comparison result between the signals output from the error amplifier 52 and the triangular wave signals output from a triangular wave generation unit 53. With the above structure, the constant voltage control unit 7C performs feedback control. The power source control IC 5 further includes an inner reference voltage source and the other circuits such as an output driver circuit (not illustrated in FIG. 1 for simplicity).

The voltage across the capacitor C2 on the carriage board B is connected to the constant voltage control unit 7C on the main board A via a VH voltage detection wire 15 and a ground voltage detection wire 16 of the FFC.

The constant voltage control unit 7C compares, using the error amplifier 52, between the divided voltage across the output capacitor C2 and the reference voltage Vref', and performs control to turn on/off the switch element Q1 to eliminate error in output voltage. Through the feedback control, a predetermined output voltage VH is obtained across the capacitor C2.

To stabilize the feedback control performed by the DC/DC converter 9, the component values of a lead compensation circuit and a delay compensation circuit are adjusted, so that the output voltage fluctuation caused at a change in a power load is suppressed within the feedback loop having the coil L1, the capacitor C2, and the FFC connecting between the boards A and B with wire parasitic elements in FIG. 1.

The lead compensation circuit is configured with resistors R101 ad R102 and a capacitor C6, and the delay compensation circuit is configured with a time constant circuit 6 interposed between the input and output of the error amplifier 52. The lead compensation circuit and the delay compensation circuit are used to adjust frequency characteristics of the feedback control.

The ground potential for a reference voltage of the DC/DC converter 9 is set as HGND of the carriage board B (i.e., the GND of the capacitor C2). This setting enables matching between the ground potential of the VH voltage applied to the recording head 2 and a ground C_GND for the constant voltage control unit 7C.

The ground of the power source control IC 5 for constant voltage control of the DC/DC converter 9 and the ground of the voltage source 18 are connected to the control ground C_GND via a ground line 17.

The control ground C_GND is connected to the ground HGND via the ground detection wire 16. The ground HGND is connected to the capacitor C2 on the carriage board B. The control ground C_GND is not directly connected to the ground HGND on the main board A through a wiring pattern or a via.

The connection structure separates the ground detection wire 16 from the power supply wire ground wires 14, to prevent return current of the head drive voltage VH.

A capacitor C3 is disposed to connect the point e to the point f in FIG. 1. The connection results in the alternating connection between the ground C_GND that controls the main board A and the ground HGND that supplies power to the converter unit 7. On the main board A, the control ground C_GND is connected to the power-supply ground HGND through the carriage board B and the FFC, and thereby the capacitor C3 is useful to stabilize the feedback control.

The ground HGND of the main board A is connected to the ground HGND of the carriage board B through the power supply wire ground wires 14 using a plurality of conductive patterns of the FFC. The connection allows a return current of the head drive voltage VH to flow from the carriage board B toward the main board A along the power supply wire ground wires 14 of the FFC.

The power supply wires 13 and the power supply wire ground wires 14 of the FFC are disposed between the coil L1 and the capacitor C2 on the smoothing circuit unit 4, and thereby the wiring inductance and wiring resistance component that are parasitic elements of the FFC wiring are enclosed within the smoothing circuit unit 4.

A phase compensation circuit for constant voltage feedback control adjusts the gain and phase of the feedback loop including the parasitic elements of the FFC in addition to the characteristics of the coil L1 and the capacitor C2 in the smoothing circuit 4, to suppress a voltage fluctuation caused by a sharp change in load.

Figure 2A:
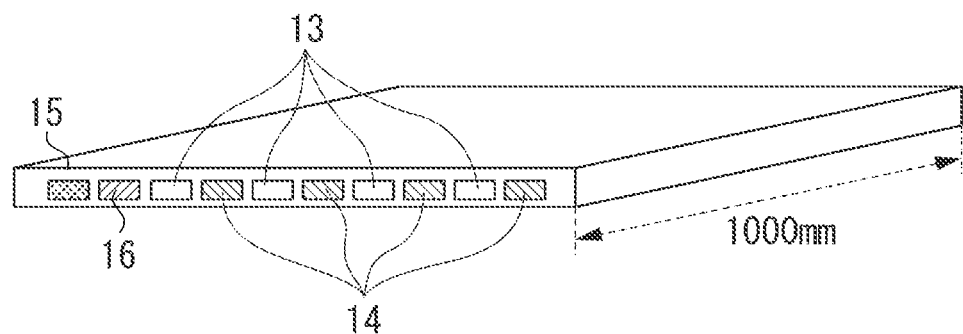
FIGS. 2A and 2B are cross sectional views each illustrating a Flat Flexible Cable (FFC) wiring pattern.

FIG. 2A illustrates a cross sectional view of a flexible flat cable (FFC) according to an exemplary embodiment. The main board A is connected to the carriage board B by the flexible flat cable (FFC). The main board A is connected to the carriage board B through the plurality of power supply wires 13 and the plurality of power supply wire ground wires 14. The wires 13 supply a voltage VH to drive the recording head 2, and the ground 14 is a return (ground) current path for the voltage VH. The electric power flowing through the flexible flat cable (FFC) is supplied to the capacitor C2 and the recording head 2.

Through the power supply wires 13, an electric current flows from the main board A to the carriage board B. Through the power supply wire ground wires 14, an electric current flows from the carriage board B to the main board A.

While the electric current flows through the power supply wires 13 of the FFC in the forward direction, the electric current through the power supply wire ground wires 14 flows in the backward direction. Thus, the electric currents flowing through the power supply wires 13 and the power supply wire ground wires 14 flow in opposite directions to each other in the FFC.

As illustrated in FIG. 1, the VH voltage detection wire 15 connects the point c where the capacitor C2 on the carriage board is connected, to the resistor R101 on the main board A.

The ground voltage detection wire 16 connects the point d which is the ground of the capacitor C2, to the ground C_GND which controls the constant voltage control unit 7C of the DC/DC converter 9.

As illustrated in FIG. 2A, the VH voltage detection wire 15 and the ground voltage detection wire 16 are disposed next to the adjacent conductive patterns of the FFC.

Figure 6:
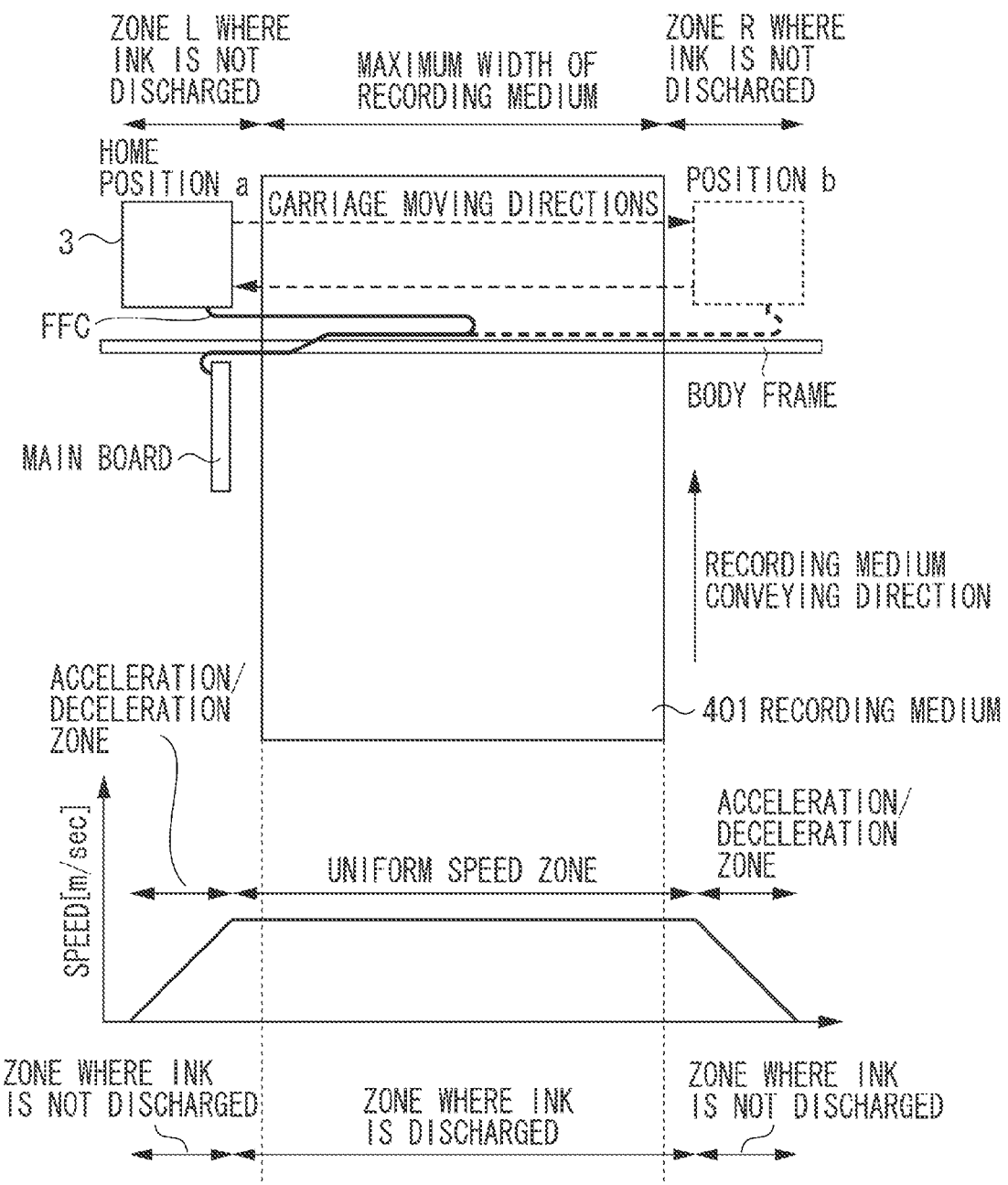
FIG. 6 illustrates an arrangement of an FFC connecting a main board to a carriage board according to an exemplary embodiment of the present invention.

The FFC is a cable providing an electrical connection for movable components and/or within a narrow space. The cable is a ribbon-like strip material having a insulating coating of a synthetic resin for example, in which a plurality of thin and flat plate-shaped conductors are arranged in parallel at a regular pitch. This is an electrical connective structure to smoothly move the carriage 3 having the recording head 2 to record images on recording paper (i.e., recording medium) by ink discharge in a serial-type printer, for example. The FFC has a sufficient length to secure a movement range of the carriage 3, and is disposed to follow the body frame of the apparatus as illustrated in FIG. 6. The length of the FFC needs to be more than twice of the 328-mm width of a recording paper in a printer type that can handle Super A3-sized recording paper for example.

Characteristics of the voltage fluctuation in the case where a wiring impedance of the FFC and a power load are sharply changed are described.

FIG. 2A illustrates a cross section of an FFC wiring structure of an exemplary embodiment of the present invention, and the FFC has four power supply wires 13 and four power supply wire ground wires 14. The power supply wires 13 and the power supply wire ground wires 14 are alternately disposed next to one another. In the wire arrangement of the FFC in FIG. 2A, patterns of the forward and backward electric current through each of the power supply wires 13 and the power supply wire ground wires 14 are adjacently and alternately disposed. The four power supply wires 13 are connected between coils and one ends of capacitors respectively, and the four power supply wire ground wires 14 are respectively connected between the grounds of the voltage conversion unit and the other ends of the capacitors.

Figure 2B:
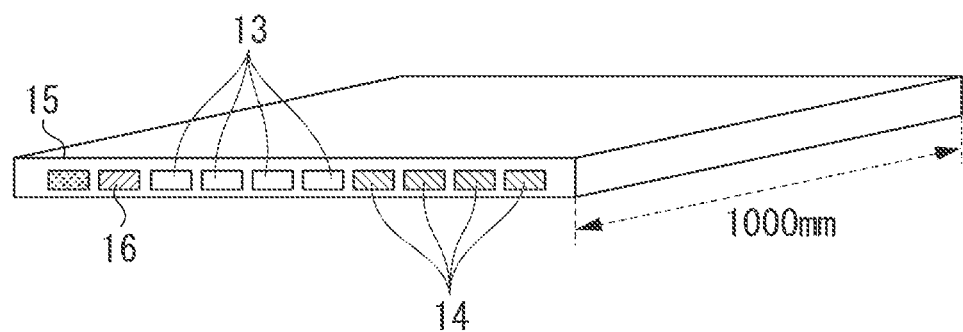

FIG. 2B illustrates a comparative exemplary embodiment (which does not implement an exemplary embodiment of the present invention). In the wire arrangement in FIG. 2B, the power supply wires 13 are disposed next to one another, and the power supply wire ground wires 14 are also disposed next to one another. In other words, the two groups of the signal lines are collectively disposed. The conductors 13 and 14 are arranged at a pitch of 1.0 mm both in FIGS. 2A and 2B.

FIG. 3 is a table illustrating difference in wiring impedances due to the difference between the arrangements of the power supply wires 13 and the power supply wire ground wires 14 in the FFC. In other words, the table in FIG. 3 lists difference in impedances due to the difference between the arrangements in FIGS. 2A and 2B. The wiring impedances are measured using an impedance analyzer. A loop inductance as the total sum of the wiring inductances with the return current paths taken into consideration, and a wiring resistance are measured. The measurement is performed by short-circuiting the power supply wires 13 and the power supply wire ground wires 14 at one end of the FFC and measuring the inductances at the other ends using the impedance analyzer. Measurement is performed at three points of FFC length of 330 mm, 660 mm, and 1,000 mm.

Referring to FIG. 3, with respect to the wiring resistance, there is not a difference in the values between the case where patterns of the forward and backward electric current are adjacently and alternately arranged in the conductive patterns and the case where the forward and backward current patterns are not adjacently and alternately arranged. In both cases, the values are in proportion to the lengths of the FFCs. On the other hand, with respect to the loop inductance, the values in the case where the forward and backward current patterns are adjacently and alternately arranged in conductive patterns are reduced to about one third compared with the case where the forward and backward current patterns are not alternately arranged.

This is because the alternate arrangement of the power supply wires 13 and the power supply wire ground wires 14 as the adjacent conductors reduces the area of the current loop flowing through the wires. Further, the currents through the adjacent wires flow in directions opposite to each other, which makes the directions of the magnetic fields generated by the currents opposite to each other. As a result, there exists a strong action to cancel the generated magnetic fields, leading to increase in the partial mutual inductance $L_{21}$ between the wires, and a value of the loop inductances Lloop is reduced.

The above measurement results indicate that the wiring resistance of an FFC is not affected by the wire arrangement for the same cross sectional area of wires, the same number of the wires, and the same length of the wires, but the loop inductance is significantly changed by the wire arrangement even for the same cross sectional area of wires, the same number of the wires, and the same length of the wires.

In other words, the loop inductance of the wires can be reduced by arranging the forward and backward loops of the electric currents flowing through the power supply wires 13 and the power supply wire ground wires 14 next to one another in the FFC.

Next, the loop inductance of the wires is described.

The electric current flowing through the power supply wires 13 is the alternating current of the triangular wave that is converted by the coil L1 and flows from the main board A toward the carriage board B. On the other hand, through the power supply wire ground wires 14, the return current of a driving current for the recording head 2 flows, in the direction opposite to the current through the power supply wires 13, from the carriage board B toward the main board A. In other words, the power supply wires 13 and the power supply wire ground wires 14 form current loops.

The loop inductance Lloop of the loops formed by the power supply wires 13 and the power supply wire ground wires 14 is given by the following formula:

$$L\text{loop} = L_{11} + L_{22} - 2L_{12}(L_{12} = L_{21}) \quad \text{(Formula 1)}$$

wherein $L_{11}$ is a partial self inductance of the power supply wires 13, $L_{22}$ is a partial self inductance of the power supply wire ground wires 14, and $L_{12}$ ($L_{21}$) is a partial mutual inductance between the power supply wires 13 and the power supply wire grounds.

The loop inductance of the power supply wires 13 and the power supply wire ground wires 14 is determined by the partial self inductance $L_{11}$ of the power supply wires 13, the partial self inductance $L_{22}$ of the power supply wire ground wires 14, and the partial mutual inductances $L_{12}$ and $L_{21}$ of the power supply wires 13 and the supply wire grounds 14 through which a return current flows.

The partial mutual inductance represents the magnetic coupling between the partial inductances $L_{11}$ and $L_{22}$ of the power supply wires 13 and the power supply wire ground wires 14 that form the current loops.

The magnetic flux generated when an electric current passes through the loop inductance of the power supply wires 13 and the power supply wire ground wires 14 is given by the following formula:

$$\phi = L\text{loop} \times I\text{rms} \qquad \text{(Formula 2)}$$

According to Formula 1, when the value of the partial mutual inductance ($L_{12}=L_{21}$) for the wire coupling between the power supply wires 13 and the power supply wire ground wires 14 increases, the loop inductance of the wires decreases.

The magnetic flux φ induced by the current loops of the power supply wires 13 and the power supply wire ground wires 14 is determined as the product of the loop inductance value of the wires and the value of the electric current flowing through the wires, according to Formula 2. For the same electric current value, a lower loop inductance value results in a smaller magnetic flux. The FFC wiring does not have a magnetic material that encloses a magnetic flux induced by an electric current flowing through the wires, unlike a coil wound around a magnetic material. Thus, the magnetic flux φ induced by the loop inductance of the FFC wiring is likely to cause magnetic coupling with the other signal lines.

The above described structure of the FFC, however, reduces a magnetic flux to be induced, suppressing magnetic coupling with the other signal lines. As a result, the FFC is prevented from becoming a noise source and the noise generated by the FFC is prevented from entering control circuits and detection circuits such as sensors (e.g., temperature sensor) in the apparatus; or the noise generated by the FFC is prevented from aggravating waveforms of control signals and data signals transmitted within the apparatus. In addition, radiation of the noise to external environment of the apparatus can be suppressed.

Magnetic coupling between the wires of the FFC is described. In the FFC, the magnetic coupling between the magnetic flux induced by the power supply wires 13 and the power supply wire ground wires 14 and the magnetic flux induced by the VH voltage detection wire 15 and the ground voltage detection wire 16 may impair the characteristics of the output voltage fluctuation because the wires all belong to the constant voltage feedback loop.

When the magnetic flux φ induced by the current loop of the power supply wires 13 and the power supply wire ground wires 14 interlinks with the VH voltage detection wire 15 and the ground voltage detection wire 16, a generated magnetic flux φ' is given by the following formula:

$$\phi' = M \times I\text{rms} \, (M = \phi'/I\text{rms}) \qquad \text{(Formula 3)}$$

The mutual inductance M represents the magnetic coupling between the wiring loop of the power supply wires 13 and the power supply wire ground wires 14 and the wiring loop of the VH voltage detection wire 15 and the ground voltage detection wire 16. Thus, the mutual inductance M represents the ratio of the magnetic flux induced per unit current flowing through one current loop that interlinks with the wires of the other current loop. The mutual inductance M is determined by the physical and spatial arrangement of the two signal wire loops which affect each other. The magnetic flux φ' that interlinks the wires according to (Formula 3) is in proportion to the electric current flowing through the wire loop that generates a magnetic flux.

The electric current flowing through the power supply wires 13 and the power supply wire ground wires 14 is large enough for the VH voltage detection wire 15 and the ground voltage detection wire 16. As a result, the magnetic flux φ induced by the wire loop of the power supply wires 13 and the power supply wire ground wires 14 interlinks with the VH voltage detection wire 15 and the ground voltage detection wire 16, which is the main reason for the aggravation of the characteristics of constant voltage feedback loop.

A noise voltage v is induced by the interlinkage of the magnetic flux φ' with the VH voltage detection wire 15 and the ground voltage detection wire 16. The magnetic flux φ' is generated by the loop current Irms through the power supply wires 13 and the power supply wire ground wires 14. The noise voltage v is given by the following formula:

$$v = j\omega M \times I\text{rms} \qquad \text{(Formula 4)}$$

The noise voltage v induced according to Formula 4 enters the constant voltage feedback loop as disturbance, and disrupts the characteristics of the output voltage fluctuation. The disturbance is different from the fluctuation of the power load (recording head).

As described above, the wiring structure of the FFC reduces loop inductance value Lloop that is caused by the wire loop according to Formula 1. As a result, the reduction in loop inductance value leads to reduction in the magnetic flux φ which is given by Formula 2 and induced by an electric current flowing through the wire loop of the power supply wires 13 and the power supply wire ground wires 14. The reduction in the magnetic flux φ induced at the power supply wires 13 and the power supply wire ground wires 14 then leads to relative reduction in the magnetic flux φ' that interlinks with the VH voltage detection wire 15 and the ground voltage detection wire 16. Therefore, the mutual inductance M is reduced, and the noise voltage v is reduced. As a result, the disturbance entering the constant voltage feedback loop is reduced, suppressing the output voltage fluctuation of the DC/DC converter 9.

FIGS. 4A to 4C illustrate the characteristics of voltage fluctuations occurring when power load is changed in the wire structure of the FFC of the first exemplary embodiment. FIGS. 4A to 4C illustrate the waveforms of VH voltage fluctuations occurring when the power load of the DC/DC converter 9 is repeatedly changed from the load current 0 A corresponding to a stopping period of the recording head 2, to the maximum load current of 2.1 A corresponding to a driving period of the recording head 2, in the wire structure of the FFC illustrated in FIG. 2A. The waveforms represent the VH voltage fluctuations when the power load is changed, for a 1,000-mm long FFC in FIG. 4A, for a 660-mm long FFC in FIG. 4B, and for a 330-mm long FFC in FIG. 4C, as parameters of an FFC length.

FIGS. 5A to 5C illustrate the characteristics of fluctuations occurring when power load is changed in a wire structure of an FFC, for comparison with the first exemplary embodiment. FIGS. 5A to 5C illustrate the waveforms of VH voltage fluctuations when the power load of the DC/DC converter 9 is repeatedly changed from the load current 0 A corresponding to a stopping period of the recording head 2, to the maximum load current of 2.1 A corresponding to the driving period of the recording head 2, in the wire structure of the FFC illustrated in FIG. 2B.

As in FIGS. 4A to 4C, the waveforms represent the VH voltage fluctuations when power load is changed, for a 1,000-mm long FFC in FIG. 5A, for a 660-mm long FFC in FIG. 5B, and for a 330-mm long FFC in FIG. 5C, as parameters of an FFC length.

The waveforms of the VH voltage fluctuations are obtained by measuring voltages across the capacitor C2 on the carriage board B.

The behavior of the voltage fluctuation in FIG. 4C for the for 330-mm long FFC exhibits a drop in the output voltage except the fluctuation ripple associated with switching when the load current is changed from 0 A to 2.1 A. The voltage fluctuation drops from −21 mV to −32 mV for the 1,000-mm long FFC in FIG. 4A, resulting in a slight increase of −11 mV in voltage fluctuation.

On the other hand, the behavior of the voltage fluctuation for 330-mm long FFC in FIG. 5C also exhibits a drop in the output voltage when the load current is changed from 0 A to 2.1 A. The voltage fluctuation, however, drops from −21 mV to −93 mV for the 1,000-mm long FFC in FIG. 5A, resulting in a considerable increase of about −70 mV in voltage fluctuation.

The results indicate that the above-described FFC structure can suppress the loop inductance of the wires in the FFC, leading to suppression of the voltage fluctuation at sharp changes in load.

The following supplements the description of the DC/DC converter 9. The carriage board B disposed near the recording head 2 is configured to have only the output capacitor of the DC/DC converter 9 mounted thereon. The DC/DC converter 9 includes the smoothing circuit 4 of a general configuration with a low-pass filter composed of the coil L1 and the capacitor C2.

The capacitor C2 serves to smooth an output voltage of the DC/DC converter 9, and also serves to accommodate a change in load that is caused by ink discharge. Accordingly, the capacitor C2 of low impedance is disposed on the carriage board B near the recording head 2.

The capacitor C2 is connected to the main board A through the FFC, and thereby is disposed on the carriage board B which is positioned relatively far from the main board A. The voltages across the capacitor C2 on the carriage board B are sensed by the VH voltage detection wire 15 and the ground voltage detection wire 16. Accordingly, the constant voltage control is performed separated from the power supply wires 13 and the power supply wire ground wires 14 where a large electric current flows. Thus, no drop in the DC voltage is caused by the wiring resistances of the power supply wires 13 and the power supply wire ground wires 14 that connect the boards.

FIG. 3 illustrates difference in wiring inductance and wiring resistance due to the connection structure of an FFC. The value of the wiring inductance is a few hundreds of nano Henries (nHs) even for the 1,000-mm FFC.

The coil L1 mounted to the main board A includes a highly permeable magnetic material having a wire wound around, and has a high inductance. Generally, a DC/DC converter having a switching frequency of 1 MHz or less uses a coil of tens to hundreds of µH, which is tens to hundreds times larger than the wire inductance of the FFC.

The coil L1 smoothes an AC rectangular wave voltage obtained by switching the DC input voltage VHin by the switch element Q1 and the diode D1, in corporation with the output capacitor.

The coil L1 having a high inductance is mounted directly downstream of the switch element Q1. This structure increases an alternating current impedance, and enhances the effect to decrease harmonic content of the AC rectangular wave voltage. Accordingly, the structure prevents transmission of voltage and current waveforms containing high frequency band components to the FFC having long wires which connects between the boards A and B.

FIG. 6 is a schematic top plan view of a recording apparatus, in which the arrangement of an FFC in the recording apparatus is illustrated. The carriage 3 has a mechanism that scans in the transverse direction in FIG. 6, so that the carriage 3 makes recording on a recording medium 401 using the recording head 2 mounted to the carriage 3. The control unit 22 described with reference to FIG. 1 controls scanning of the carriage 3 by defining an acceleration zone, a uniform speed zone, and a deceleration zone as illustrated in the lower part of FIG. 6. The carriage 3 moves in both directions illustrated by the broken arrows. When the carriage 3 is at the position a, the FFC is positioned as illustrated by the solid line. When the carriage at the position b, the FFC is positioned as illustrated by the broken line.

The recording medium 401 is conveyed longitudinally (from the lower to the upper part) in FIG. 6 by a convey unit. Scanning by the recording head 2 and conveyance of the recording medium 401 are alternately performed.

The FFC, which connects the main board A to the carriage board B, is attached following the body frame. The body frame is a metal member connected to a ground of the main board A.

As illustrated in FIG. 6, the carriage 3 moves a distance equal to or longer than the width of a recording medium. Accordingly, in a recording apparatus that can make recording on a Super A3-sized recording medium, the FFC needs to have a length of about 1,000 mm.

The control unit 22 control the entire operation of the recording apparatus, and includes: an image processing circuit that processes image information received from external apparatuses (not illustrated) (e.g., host computer and digital camera); and a conversion circuit that converts the processed information into image data to be transmitted to the recording head 2. The control unit 22 also controls the output of control signals (CLK, LT, and HE) to drive recording devices and a data signal (DATA), so that ink is discharged from the recording head 2.

The following description supplements the effect of the first exemplary embodiment. A case is described where the capacitor C2 is mounted to the main board A instead of the carriage board B, differently from the structure of the first exemplary embodiment illustrated in FIG. 1. In this case, one terminal of the capacitor C2 is connected to a point between the coil L1 and the power supply wire VH of the FFC, and the other terminal of the capacitor C2 is connected to the ground HGND of the main board A. In other words, the carriage board B is not provided with a capacitor. Such a structure increases the impedance between the wire VH and the ground HGND on the carriage board B, and thereby, as compared to the first exemplary embodiment, noise is more likely to enter the VH voltage detection wire 15 and the ground voltage detection wire 16 as disturbance, which destabilizes the output voltage.

A second exemplary embodiment is described. The description about the same parts with those of the first exemplary embodiment is omitted. The same components are denoted with the same reference numerals throughout the drawings and will not be described.

Figure 7:
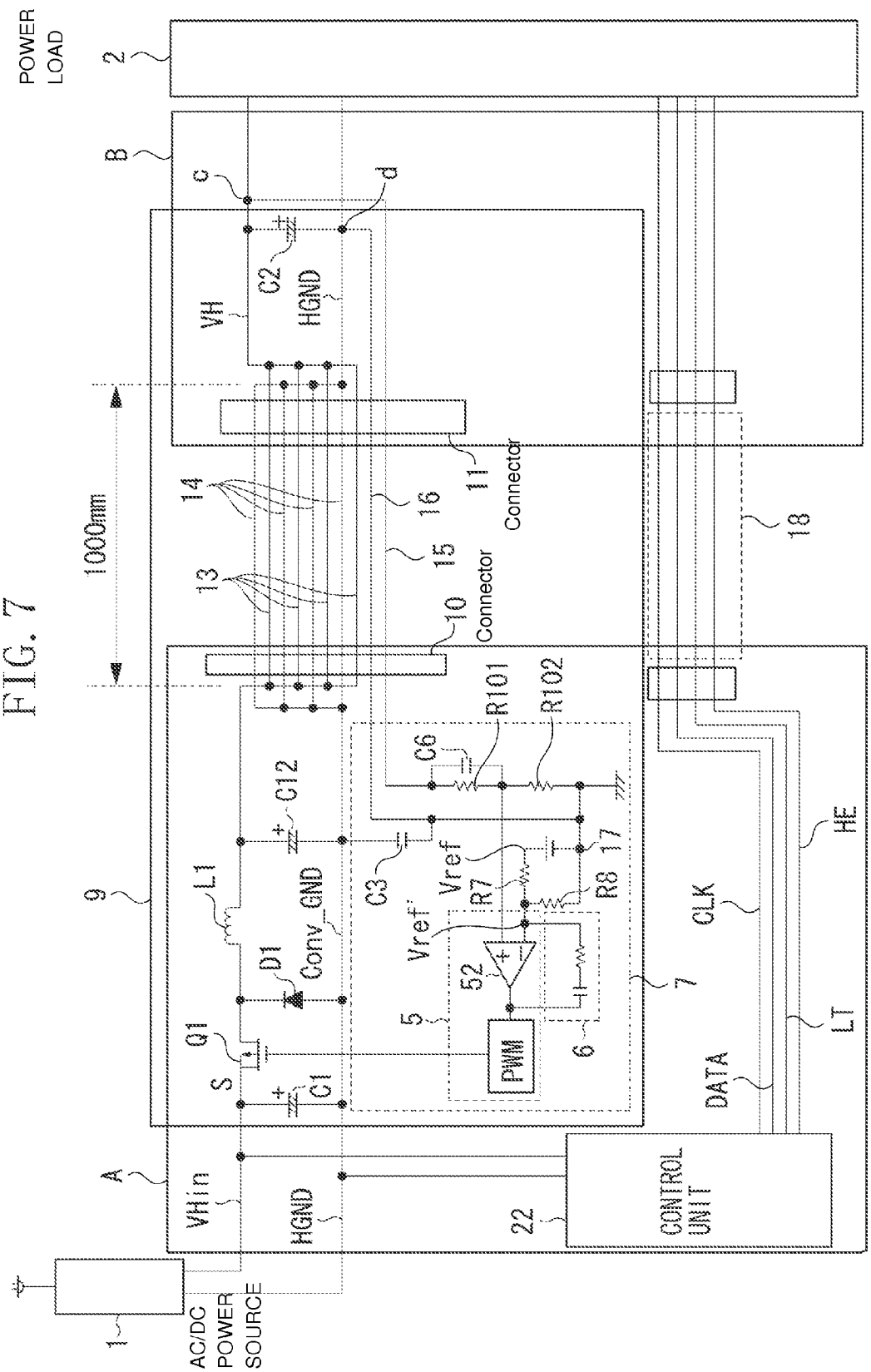
FIG. 7 illustrates a power supply apparatus according to a second exemplary embodiment of the present invention.

FIG. 7 illustrates a DC/DC converter 9 of the second exemplary embodiment. The DC/DC converter 9 of the second exemplary embodiment differs from the first exemplary embodiment in that a capacitor C12 is provided between the power supply wire of the FFC connecting the boards A and B, and the ground HGND of the main board A.

The addition of the capacitor C12 further reduces the magnetic flux $\phi$ induced by the electric current flowing through the power supply wires 13 and the power supply wire ground wires 14 of the FFC. In addition, the magnetic flux $\phi'$ that interlinks with the VH voltage detection wire 15 and the ground voltage detection wire 16, and the induced noise voltage is reduced.

In the first exemplary embodiment, the FFC does not contain a magnetic material that encloses a magnetic field like a coil, and thereby cannot completely eliminate the magnetic flux generated around the wire conductors. In addition, the magnetic coupling between signal wires changes in a complex manner depending on the physical and spatial arrangement of the FFC, and the induced magnetic flux changes in proportion to the loop inductance value and the effective value of an electric current flowing through the wires.

In the second exemplary embodiment, the main board A further includes the capacitor C12, so that the effective value of the triangular wave current flowing through the power supply wires 13 and the power supply wire ground wires 14 is reduced, and the magnetic flux $\phi$ generated by the power supply wires 13 and the power supply wire ground wires 14 according to Formula 2 is reduced.

The capacitor C12 forms a smoothing circuit of an LC filter together with the coil L1 on the main board A, to convert the current to a DC voltage in advance at the upstream stage of the FFC, so that the peak value of the triangular wave current flowing through the loop inductance of the FFC wires is reduced. The reduction of the peak value of the triangular wave current results in reduction of the current effective value, which leads to reduction of the magnetic flux $\phi$ induced by the wire loop inductance of the power supply wires 13 and the power supply wire ground wires 14.

The capacitor C12 may have a capacity value which is only about 1/3 to 1/20 of the capacitor C2 on the carriage board B. Such a capacity value sufficiently allows the capacitor C12 to operate as a filter.

As for the type of the capacitor, the capacitor C12 can be an aluminum electrolytic capacitor having a relatively large equivalent series resistance, to prevent generation of a point of reverse curve in gain/phase due to the resonance frequency caused by the coil L1 and the wiring inductance.

The above description can be supplemented as follows. Reduction in the effective value Irms of a triangular wave current leads to reduction in the magnetic flux $\phi'$, which is given by Formula 3 and interlinks with the VH voltage detection wire and the ground voltage detection wire, and leads to reduction in the noise voltage v, which is given by Formula 4 and induced by the VH voltage detection wire and the ground voltage detection wire. These reductions decrease the disturbance entering the constant voltage feedback loop, suppressing the output voltage fluctuation.

As described above, the simple circuit configuration can suppress the radiation of unwanted noise and supply a stable voltage in response to changes in power load.

Other Embodiments

In the above exemplary embodiments, a recording apparatus is used as an example of a power supply apparatus, but the present invention is not limited to the recording apparatus. The present invention is applicable to any apparatus in which an FFC is provided and an electric power is supplied to a power load using the FFC. Other examples of the apparatus include image input apparatuses, information apparatuses such as personal computer and cell phone, display apparatuses such as display, and medical apparatuses.

The present invention is not limited to the recording head that has been used as an example of a power load. Other examples of the power load include motors, display devices, and integrated circuits.

In the above exemplary embodiments, a DC/DC converter of a 1-channel line output type is used, but the present invention is applicable as well to the other DC/DC converters having a plurality of channels for output.

When DC/DC converters having a plurality of channels for output are used, the DC/DC converters may have the structure according to the first or second exemplary embodiment.

In the above exemplary embodiments, four power supply wires and four power supply wire grounds are used as an example, but the numbers of the power supply wire and the power supply wire ground can be determined depending on a current value supplied to the power load, an FFC length, and a pitch between conductors.

In the structures of the first and second exemplary embodiment, the main board A has the constant voltage control unit 7 configured to perform feedback based on the voltage input from the carriage board B, but the constant voltage control unit 7 can be eliminated.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-016894 filed Jan. 28, 2011, which is hereby incorporated by reference herein in its entirety.

What is claimed is:

1. A power supply apparatus, comprising: a power conversion unit configured to convert a first voltage into a second voltage; and a smoothing unit configured to smooth the second voltage output from the power conversion unit, the smoothing unit including a coil arranged on a first board, a first capacitor arranged on a second board, and a cable; and a control unit configured to control the power conversion unit for regulating the second voltage output from the smoothing unit based on a voltage of the first capacitor; wherein the cable connects the first board and the second board comprises a plurality of power supply wires connecting one end of the first capacitor to the coil and a plurality of ground wires connecting the other end of the first capacitor to a ground of the power conversion unit, and one of power supply wire is arranged between every two consecutively arranged ground wires, the control unit is arranged on the first board and detects the voltage of the first capacitor arranged on the second board by a first detection line and a second detection line, the first detection line being arranged in the cable and connected to a power supply line of the second board and the control unit, and the second detection line being arranged in the cable and connected to a ground for the smoothing unit of the second board and the control unit, and the power supply apparatus further comprising a second capacitor is arranged to connected to connect a ground for the smoothing unit of the first board to the second detection line.

2. The power supply apparatus according to claim 1, wherein the power conversion unit includes a switch unit and the control unit controls turning on/off of the switch unit based on the detected voltage.

3. The power supply apparatus according to claim 2, wherein the switch unit includes a transistor, and wherein the control unit supplies a signal to a control terminal of the transistor to control turning on/off of the transistor.

4. The power supply apparatus according to claim 3, wherein one end of the coil is connected to an output terminal of the transistor, and the other end of the coil is connected to the power supply wire.

5. An apparatus having a power load that operates when supplied with an electric power from the power supply apparatus according to claim 1.

6. The power supply apparatus according to claim 1, wherein the power conversion unit is a DC/DC converter.

7. The power supply apparatus according to claim 1, further comprising:
a recording head configured to move by being supplied the voltage output from the smoothing unit;
a printing apparatus body including the first board; and
a carriage including the recording head and the second board.

8. The power supply apparatus according to claim 1, wherein one of ground wire is arranged between every two consecutively arranged power supply wires.

9. The power supply apparatus according to claim 1, wherein the power supply wires and the ground supply wires are arranged in an alternate manner in the cable.

10. The power supply apparatus according to claim 1, wherein a ratio of a number of the power supply wires and a number of the ground wires is 1:1 in the cable.

11. The power supply apparatus according to claim 1, wherein one of the power supply wires is arranged at one end of the cable and one of the ground wires is arranged at an opposite end of the cable.

12. The power supply apparatus according to claim 1, the plurality of power supply wires and the plurality of ground wires are arranged in a direction crossing with a current direction of the cable.

13. A recording apparatus, comprising:
a first board disposed in a body of the recording apparatus, which is provided with a power conversion unit configured to convert a first voltage into a second voltage, and a coil connected to an output of the power conversion unit;
a second board disposed in a carriage having a recording head and provided with a first capacitor connected to the recording head;
a cable having a plurality of power supply wires and a plurality of ground wires that are alternately arranged for the second voltage output from the power conversion unit between the coil and the first capacitor such that every two consecutively arranged ground wires are separate from each other by one of the power supply wires;
a control unit configured to control the power conversion unit for regulating the second voltage output from the smoothing unit based on a voltage of the first capacitor;
wherein the control unit is arranged on the first board and detects the voltage of the first capacitor arranged on the second board by a first detection line and a second detection line, the first detection line being arranged in the cable and connected to a power supply line of the second board and the control unit, and the second detection line being arranged in the cable and connected to a ground for the smoothing unit of the second board and the control unit, and
the recording apparatus further comprising a second capacitor is arranged to connect a ground for the smoothing unit of the first board to the second detection line.

14. The recording apparatus according to claim 13, wherein every two consecutively arranged power supply wires are separate from each other by one of the ground wires.

15. The recording apparatus according to claim 13, wherein a ratio of to number of the power supply wires and a number of the ground supply wires is 1:1 in the cable.

16. The recording apparatus according to claim 13, wherein one of the power supply wires is arranged at one end of the cable and one of the ground wires is arranged at an opposite end of the cable.

17. The recording apparatus according to claim 13, wherein the wires are arranged in a direction crossing with a current direction of the cable.

18. A power supply apparatus, comprising: a power conversion unit configured to input a voltage to convert the voltage into an second voltage; and a smoothing unit configured to include a coil arranged on a first board, a first capacitor arranged on a second board, and a cable, the cable comprising a plurality of wires connecting one end of the first capacitor to the coil and a plurality of wires connecting the other end of the first capacitor to a ground of the power conversion unit, a control unit configured to control the power conversion unit for regulating the second voltage output from the smoothing unit based on a voltage of the first capacitor; wherein the wires are so arranged that a magnetic field generated by a current flowing through each the of wires is at least partly cancelled by a magnetic field generated by a current flowing through any one of the wires immediately adjacent thereto in a direction crossing with a current direction of the cable, the control unit detects the voltage of the first capacitor by a first detection line and a second detection line, the first detection line being arranged in the cable and connected to a power supply line of the second board and the control unit, and the second detection line being arranged in the cable and connected to a ground for the smoothing unit of the second board and the control unit, and the power supply further comprising a second capacitor is arranged to connect a ground for the smoothing unit of the first board to the second detection line.

19. The power supply apparatus according to claim 18, wherein the wires are arranged in a direction crossing with a current direction of the cable.

* * * * *